(12) United States Patent
Vassura et al.

(10) Patent No.: US 6,517,003 B2
(45) Date of Patent: Feb. 11, 2003

(54) LEAST PARTIALLY COLORED OPTICAL CODE READER

(75) Inventors: Stefano Vassura, Pianoro (IT); Rinaldo Zocca, Bologna (IT)

(73) Assignee: Datalogic S.p.A., Reno (IT)

( * ) Notice: Subject to any disclaimer, the term of this patent is extended or adjusted under 35 U.S.C. 154(b) by 18 days.

(21) Appl. No.: 09/792,090

(22) Filed: Feb. 22, 2001

(65) Prior Publication Data

US 2001/0015377 A1 Aug. 23, 2001

(30) Foreign Application Priority Data

Feb. 22, 2000 (EP) .......................................... 00830122

(51) Int. Cl.⁷ ................................................ G06K 7/10
(52) U.S. Cl. ............................. 235/472.01; 235/462.45
(58) Field of Search ......................... 235/462.45, 472.01

(56) References Cited

U.S. PATENT DOCUMENTS 3,699,312 A   10/1972   Jones et al. ............... 253/61.11
5,231,277 A * 7/1993   Kozo et al. ............ 235/472.01

FOREIGN PATENT DOCUMENTS

EP            0755018            1/1997

* cited by examiner

Primary Examiner—Harold I. Pitts
(74) Attorney, Agent, or Firm—Steinberg & Raskin, P.C.

(57) ABSTRACT

An optical code reader comprises a casing (1) consisting of at least two portions (2, 3) connected together, a first portion (2) defining the main reader body and the second portion (3) defining a closure element for that part (5) of the body supporting at least the reader optical members; at least a part (10) of the said casing (1) has a coloration which depends on at least one control signal, this coloration being chosen on the basis of the type of use for which the reader is provided.

29 Claims, 2 Drawing Sheets

LEAST PARTIALLY COLORED OPTICAL CODE READER

FIELD OF THE INVENTION

The present invention relates to an optical reader comprising a casing which has a coloration depending on at least one control signal.

BACKGROUND OF THE INVENTION

An optical reader is known to comprise a casing consisting of at least two portions coupled together by usual fixing means, and of which a first portion defines the main reader body and the second portion defines a closure element for that part of said body supporting at least the reader optical members and possibly also those electrical and electronic members which enable it to operate.

Readers of the aforesaid type find considerable use in many sectors of industry and commerce. Readers of various types are used to satisfy the most diverse requirements, for example for sorting goods, for handling warehouse products, and for retail and wholesale sales (in shops or supermarkets).

Specific readers therefore have to be manufactured having not only different functional characteristics but also an appearance suitable for the function for which they are proposed. There is therefore a requirement for readers the characteristic appearance of which is different for different uses and which also defines their particular type of use.

OBJECTS AND SUMMARY OF THE INVENTION

An object of this invention is therefore to provide optical readers having different appearances for the different uses for which they are provided, and possibly for the different environments in which they are used.

A further object is to provide optical readers in which these different appearances are achieved in a simple manner without a substantial increase in the reader production and storage costs and times.

These and further objects which will be apparent to the expert of the art are attained by a reader in accordance with the accompanying claims.

According to the invention, that appearance feature which defines each reader on the basis of its use is the colour present in at least one portion of its casing. Different colours define optical code readers with different functional characteristics or for different types of use. In other words, different colours distinguish optical code readers which differ in their type of use but which form part of the same product line. For example, those readers for particular shops in which products carrying a trademark of a predefined colour are sold will be defined by a colour identical to that of that trademark. Again, those readers for use in an environment decorated with particular colours will have a colour which matches those colour decorations. Again, optical code readers for articles of a particular class of goods will have a different colour from that of readers which are similar but are used for reading the codes on articles of a different class of goods.

Normally the requirement to diversify the outer appearance of the reader results in complication of the manufacturing process. In this respect, the production chain has to be differentiated by producing the same type of "core" for the reader but a plurality of differently coloured outer "casings". This complication results in a considerable increase in production and storage costs and times.

BRIEF DESCRIPTION OF THE DRAWINGS

This invention enables readers with differently coloured casings to be produced in a simpler and less costly manner. The invention will be more apparent from the accompanying drawing, which is provided by way of non-limiting example, and on which.

DETAILED DESCRIPTION OF THE INVENTION

Figure 1:
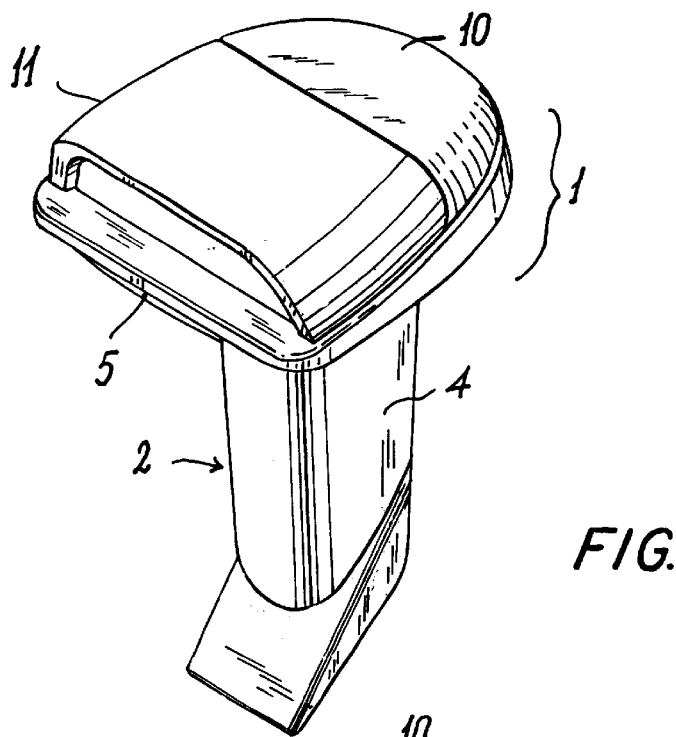
FIG. 1 is a perspective view of an optical code reader of the invention.

With reference to said figures, a casing for an optical code reader in indicated overall by 1. In the embodiment shown in the figures, it comprises at least two structural portions 2 and 3 connected together in any known manner (for example by hook-like members 2A associated with the portion 2). The first portion 2 comprises a part 4 acting as a handgrip and having an end portion 5 (that upper portion which in FIG. 1 is fixed to the portion 3 and is shown more clearly in FIG. 4) arranged to support a usual part containing optical, electrical and electronic members of the optical code reader (members associated with a part 6) and one or more lighting elements (LEDs) indicating the operation or rather the operating state of the reader. Specifically, the members associated with the part 6 enable the reading light beam to be emitted and the light reflected from an optical code to be collected for reading and for subsequent processing of the optical data obtained. The optical/electronic part associated with the part 6 can be produced by either laser or CCD technology. In the first case, this optical/electronic part comprises a scan engine for emitting the laser beam, a photodiode for collecting the light reflected by the code, and the relative electronic circuit for analyzing or processing the signal. In the second case it can comprise LEDs for illuminating the code, a linear or bidimensional CCD or CMOS sensor for collecting the light reflected by the code, and the relative electronic circuit.

The second portion 3 acts as a the closure element (or cover) for the end portion 5. This second portion is substantially of cap shape and has an aperture 7 along a lateral face 8. The light rays pass through this aperture to read the optical code in known manner, the light reflected by the optical code also passing therethrough.

Figure 4:
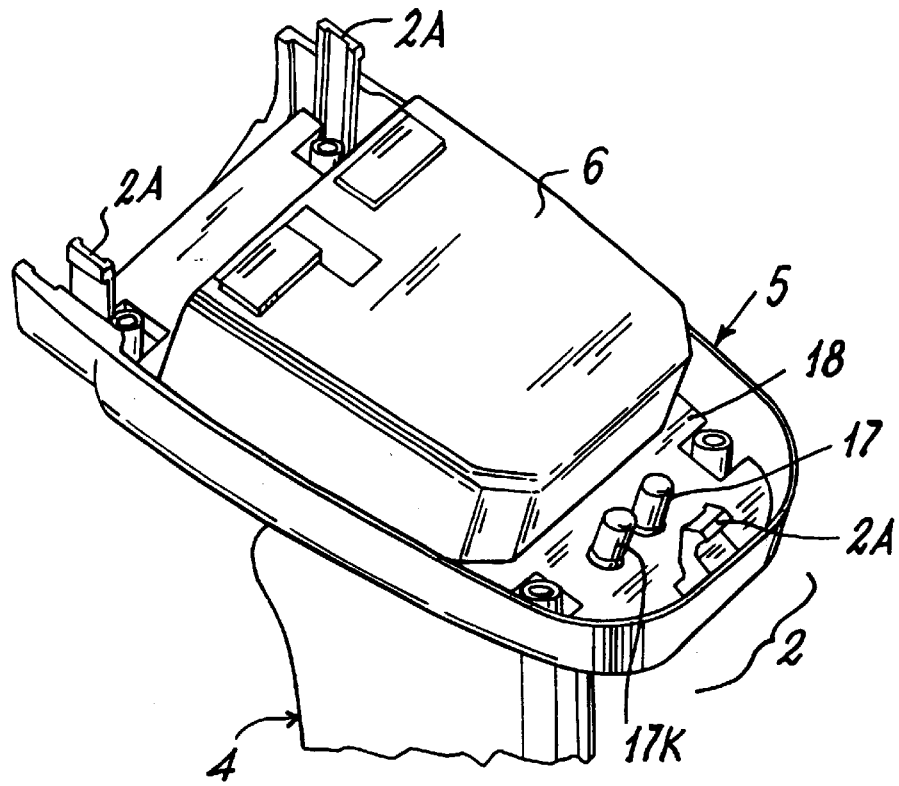
FIG. 4 is a perspective view from above of a different part of the reader of FIG. 1.

As stated, the portions 2 and 3 form the structure of the casing 1, and without these this latter would not be complete. According to a first aspect of the invention, at least a part of one of these structural portions 2 and 3 is made at least partly transparent to light. According to a second aspect of the invention, within this transparent part there is provided at least one coloured light emitter or light source 17 able to define by means of this colour a particular functional reader type or to provide the reader with a desired appearance feature. This coloured light source 17 is associated with a support structure or printed circuit 18 which also carries the part 6. This source can be any coloured light source, and in particular can be:

a) an LED (light emitting diode) (as shown in FIG. 4);
b) a lamp (eg. neon, incandescent, halogen);
c) a laser diode possibly combined with a suitable light diffuser to produce diffused coloured light emission.

Hence, by virtue of the invention, using simple and low-cost means, a plurality of optical code readers characterised by different colours can be obtained. For this purpose it is necessary only to produce a plurality of printed circuits 18 carrying sources 17 of different colours, for mounting in totally identical casings 1, but which after the circuit has been mounted differ from each other by the different colouring offered by the relative said sources.

It should be noted that the transparent portion does not necessarily have to be directly over the light source 17, as the light emitted by this source, even if not lying below the transparent part, is in any event visible by the operator. This facilitates construction of the casing 1 and reduces its production time.

The transparent part can be at least a part of the portion 2 or, preferably, of the closure element 3. With reference to the figures and to the embodiment shown therein, the element 3 has an end part 10 positioned above the source 17 defined by a LED associated with the portion 2 (shown in FIG. 4). This part 10 is at least partially (or totally) transparent to light so that the light emitted by the LED 17 is well visible when the casing 1 is observed from different angles. This part 10 (which preferably occupies a relatively significant part of the overall surface area of the casing, ie at least 5% of this overall area) is of material semi-transparent or completely transparent to light. By way of example, a suitable material is a polycarbonate, for example that produced by Bayer and known as Makrolon 6555, or that produced by Bayer and known as Makrolon 6557, coloured or of opaline colour.

Figure 2:
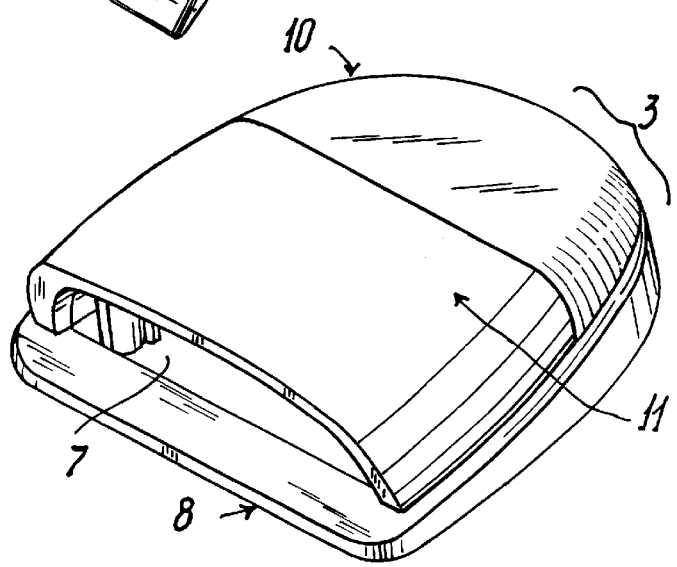
FIG. 2 is a perspective view of a part of the reader of FIG. 1.

A part 11 (see FIG. 2) of rubber construction and comprising the aperture 7 is associated in known manner (for example by co- moulding) with the part 10.

Figure 3:
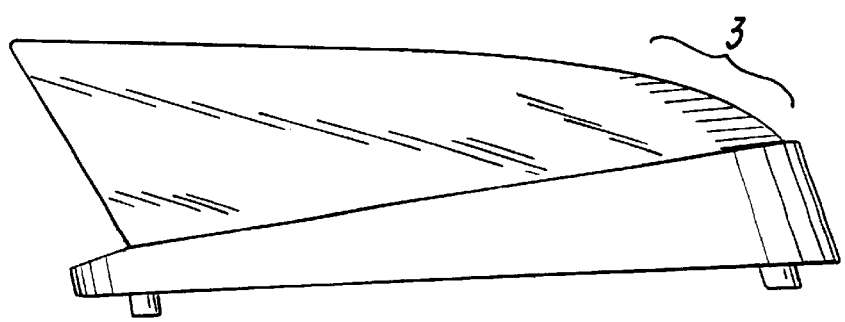
FIG. 3 is a side view of that reader part of FIG. 2.

In a first variant of the invention, the entire closure element 3 (see FIG. 3) and/or the entire portion 2 is constructed of material transparent or semi-transparent to light so as to still further increase (compared with the known art) the visibility of the underlying light source 17 when active, by virtue of a considerable diffusion of the light emitted by it.

According to a further characteristic of the invention, the light source 17 is preferably active when the reader is in its stand-by state, ie when no operating state (for example reading, good read, no read) is activated. The reader remains in this state until the user presses the trigger, to activate the operative reading state.

The stand-by state is automatically restored (ie the light source 17 is again lit) on conclusion of the reading process, ie when the reader has decoded the read code or has indicated "no read".

According to a second variant of the aforedescribed embodiment, the reader of the invention comprises a plurality of coloured light sources. Hence one of these sources can be activated at choice to obtain the required colour in the stand-by state (or in the active state), using switch means (not shown) connected into usual feed lines for these sources, to be activated or deactivated either by the user or during the reader production stage.

According to this variant, the plurality of sources 17 comprise at least three light sources, for example LEDs, of different colours (for example RED, GREEN and BLUE). With the three LEDs (red, green and blue) several different colorations can be obtained from the three main colours red-green-blue by mounting the LEDs very close to each other and activating them appropriately to cause the light emitted by each one to mix with the light of the other two.

In this manner, the reader colour could also be yellow, orange, light blue, etc.

It should be noted that in this embodiment, the printed circuit 18 is always the same for all the readers, different coloured casings being obtained by suitably activating (possibly according to the requirements of the user) the LEDs present.

According to a further variant of the invention, the coloured light source 17 comprises at least one light generator (for example an LED) of RGB type, enabling a multiplicity of colours to be obtained.

Such a generator (used for example in monitors and video projectors) incorporates within a single component three separate photo-emitters (R=RED, G=GREEN, B=BLUE) positioned close together. The light intensity of each of the three photo-emitters can be adjusted independently by feeding it with a suitable current level. As the three photo-emitters are positioned close together such that for practical purposes the three colours are emitted from a seemingly single point, by suitably changing the light intensities a vast (practically infinite) range of colours can be obtained, in accordance with the RGB technique used in monitors or video projectors. As the photo-emitters can be fed with direct current or pulsating current (in known manner), the light intensity of each photo-emitter can be varied by in the first case varying the current level through it, and in the second case varying the mean current value, ie varying the signal frequency and its duty-cycle.

Figure 5:
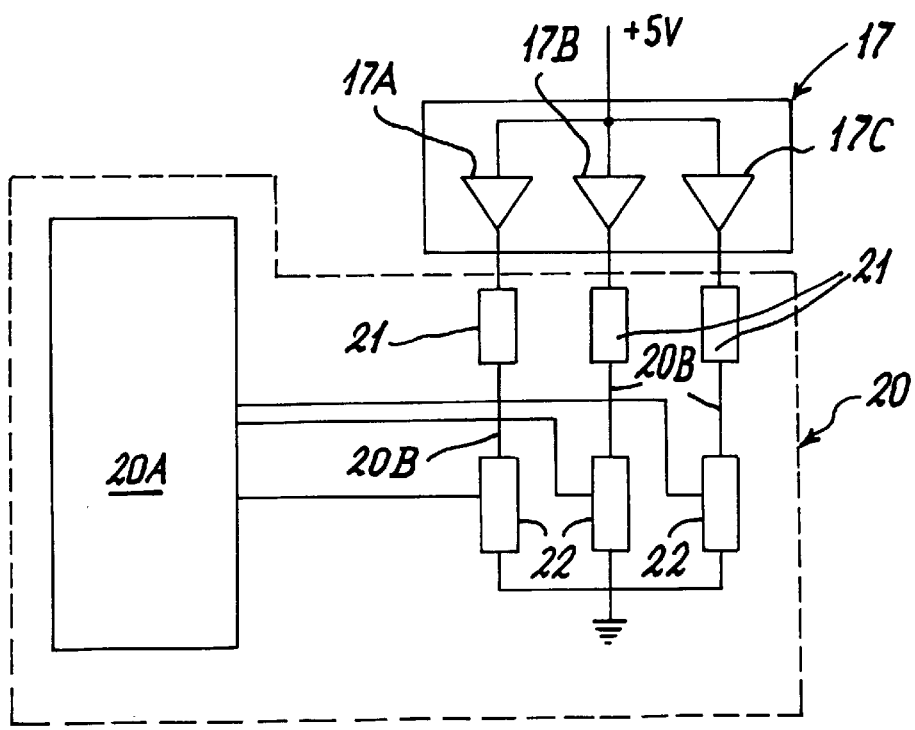
FIG. 5 is a circuit diagram of a portion of a variant of the reader of FIG. 1.

In order to make it as simple as possible to change the coloration of the reader incorporating a source 17 with at least one LED of RGB type (or RGB source) a microprocessor circuit 20 has been conceived, as shown in FIG. 5. In this latter, the various monochromatic photo-emitters of the source 17 are indicated by 17A, 17B and 17C. The light intensity of each of these latter is controlled and driven by the circuit 20 in which a microprocessor 20A is present. Each individual photo-emitter is connected in series with a polarization resistor 21 and with a static switch 22 controlled by the microprocessor 20A (these being positioned in respective power lines 20B which are separate for each photo-emitter) and which, when closed, feeds a current equal to the maximum allowed by the photo-emitter. In this state, the light intensity generated by the photo-emitter (or the relative emission colour) is a maximum.

In the embodiment under examination, the microprocessor 20A provides three driver signals, one for each emission colour, which control the closure of the static switches 22. These signals consist of drive pulses having a fixed frequency (about 50 Hz) and a duty-cycle programmable for a plurality (for example 128) of separate values. By varying the pulse duration (by pulse width modulation) the mean value of the photo-emitter feed current and hence the light intensity of the corresponding colour can be varied.

It is hence possible to associate with the reader, for example when in the stand-by state, a plurality of combinations of the light intensity of each monochromatic emitter 17A, 17B, 17C, to thus produce a variety of different indicating colours.

In a modification to the embodiment under examination, a variable chromatic effect in the reader is obtained in the stand-by state. In this modification, the microprocessor 20A acts on the switches 22 in accordance with a predefined control algorithm to achieve a particular sequential activation of the photo-emitters 17A, 17B and 17C such as to provide a chosen colour sequence and hence a particular chromatic effect (for example the source 17 passes from red to blue cyclically via all intermediate tones).

With this modification the colour in the stand-by state can be defined by the user on the basis of specific requirements.

The user "selects" the required colour, and can change it later by suitably modifying the algorithm which controls the microprocessor operation.

Again, with this modification readers of different colours can be produced using the same printed circuit for the indicator LEDs.

According to the invention the reader can also assume a particular colour in each of the reader operating states (in addition to stand-by). This is achieved by adding one or more light sources 17K to the light source or sources 17 which define the reader coloration in the stand-by state.

The reader operating states to be indicated to the user can be the following:

1. "ILLUMINATOR ON", this state indicating that the illumination system is active and ready to scan the code;
2. "GOOD READ", this state indicating that the code has been decoded;
3. "NO READ", this state indicating that the code has failed to be decoded.

In known readers, these indications are given by usual pilot lamps which light according to the reader operating state. In this respect, the usual reader operating cycle is as follows:

The reader is initially in its stand-by state. This state is interrupted when the operator pulls the trigger to initiate code reading. The illumination system in the optical/electronic part associated with the part 6 lights to initiate code scanning (ILLUMINATOR ON state). If the reading is successful (ie if the code has been decoded) the GOOD READ state is activated. If the code has not been read after a certain time (a few seconds, corresponding to a certain number of reading attempts) the NO READ state is activated.

Following the GOOD READ or NO READ state the STAND-BY state is restored (and the cycle closes). This state is again interrupted by pulling the trigger to commence reading of a new code, or of the previous code (at the discretion of the user) should this have failed.

According to the invention, the printed circuit 18 comprises one or more light sources 17 for "colouring" the reader when in the stand-by state and one or more light sources 17K for indicating the aforelisted other operating states by means of other lights.

In a variant, the same light source group 17 which colours the reader can also be used to indicate all the reader operating states by particular colorations. This embodiment is advantageous in terms of simplicity and economy as it comprises a single group of light sources 17 which perform all the functions (colouring the reader and indicating the reader operating states) which in known readers are performed by several light sources.

In both these embodiments, the indicating lights can be produced by red, green and blue (and/or other coloured) LEDs positioned in the printed circuit 18 and suitably activated. By suitably activating the LEDs, all the colours needed to indicate the reader states can be obtained (by mixing the colours). These embodiments can also be formed with at least one light source 17 comprising at least one RGB LED as heretofore described. It is hence possible to associate with each reader operating state (STAND-BY, ILLUMINATOR ON, GOOD READ, NO READ) a different combination of the light intensities of each individual monochromatic photo-emitter and hence the emission colour of the entire indicating system. In this manner a plurality of indicating light sequences are obtained which differ by the colours associated with the various operating states and the stand-by state.

More specifically, the stand-by indication can remain always lit (during the entire cycle), the other state indications (ILLUMINATOR ON, GOOD READ, NO READ) being activated sequentially. In this case the stand-by colour mixes with that specific colour for each state.

If for example the stand-by colour is blue, the "illuminator on" colour is red, the "good read" colour is green and the "no read" colour is yellow, the following cyclic sequence is obtained:

1) BLUE=STAND-BY
2) FUCHSIA-VIOLET (suitable mixture of blue and red)=ILLUMINATOR ON
3a) GREEN-BLUE (suitable mixture of blue and green)= GOOD READ or
3b) YELLOWISH (suitable mixture of blue and yellow)= NO READ
4) The sequence is repeated from point 1).

According to another embodiment, the stand-by indication is deactivated when the reading state is activated, and is activated again only on termination of the reading (whether successful or not). In this case the stand-by colour does not mix with those indicating the operating states. If for example the stand-by colour is blue, the "illuminator on" colour is yellow, the "good read" colour is green and the "no read" colour is red, the following cyclic sequence is obtained:

1) BLUE=STAND-BY
2) YELLOW=ILLUMINATOR ON
3a) GREEN=GOOD READ or
3b) RED=NO READ
4) The sequence is repeated from point 1).

Obviously, these colours associated with the stand-by and other states are purely indicative, and suggested by way of example, they being able to be replaced by any other colour at choice (they can also be defined by the user).

The two aforestated sequences can be implemented either for two separate light source groups (one 17 for colouring the reader and one 17K for indicating the operating state), or for a single source group 17 embracing the two functions.

In the first case, a monochromatic LED 17 (or a number of monochromatic LEDs or an RGB LED) indicates the stand-by state of the desired colour and one or more LEDs 17K (monochromatic or RGB) indicate the operating states either by mixing with the stand-by colour or not. In the second case, at least one LED of the source 17 for colouring the reader acts as a stand-by indicator of the required colour, the other LEDs of this source indicating the operating states either by mixing with the stand-by colour or not.

In this second case, a single RGB LED could be used to indicate (by different colours) not only the different operating states but also the stand-by state, by suitably controlling the photo-emitters.

According to a further embodiment, different indication colours can be used for indicating different types of "NO READ". This means that different colours can be used to indicate different reasons for a failed read, for example:

a) the code has not been read because it is outside the reading range;
b) the code has not been read because it is damaged;
c) the code has not been read because it pertains to a code category unknown to the reader.

In a further variant of the invention, an electrically powered coloured liquid crystal display (for example such as that used in a laptop computer) is provided on the coloured part 10 of the casing 1 and can be activated on command to give that part the desired coloration. By suitably powering the "light points" of this display all the desired colours can be obtained from it, together with possible display thereon of logos or images at will.

According to a further embodiment, the coloured part 10 of the casing 1 is provided by at least one piece formed of at least one known electroluminescent polymer such as those marketed by ELUX LTD or ELTECH (Electroluminescent Technologies Corporation). Using these polymers very thin light sources can be obtained of any desired shape. These electroluminescent polymers are also used, for example by the UNIAX Corporation, for forming luminous displays on which "written" information can be displayed by powering different parts of the polymers defining the display.

Various specific embodiments of the invention have been described. These embodiments are applicable to all types of optical reader whatever their form.

Embodiments have also been described in which the coloured light source or sources are below the transparent or semi-transparent part of the casing 1. However the source or sources can be provided in a visible position within this transparent (or semi- transparent) part while still providing this latter with a particular coloration.

An embodiment has also been described in which that structural portion of the casing 1 of which at least a part is transparent is at least a part of the closure element 3. Depending on the position of the light source which colours the reader, this portion could obviously also be at least a part of the portion 2. Alternatively, one or more coloured light sources can be placed in different positions of the casing 1 (in one piece or comprising two or more portions) which comprises corresponding transparent parts at these sources. In this manner, a part or the whole of this casing can be coloured by electrically powered means, activated on command, to provide the required or chosen colour on the basis of the type of use for which the reader is provided.

What is claimed is:

1. An optical code reader comprising a casing (1) wherein at least a part (10) of the casing (1) is provided with its own coloration, in correspondence with said part there being provided powered electrical means (17; 17A, 17B, 17C, 17K) activatable on command to colour said part when in operation, this coloration being chosen on the basis of the type of use for which the reader is provided.

2. A reader as claimed in claim 1, wherein the electrically powered means are at least one piece of electroluminescent polymer defining the part (10) provided with its own coloration.

3. A reader as claimed in claim 1, wherein the electrically powered means are a liquid crystal screen.

4. A reader as claimed in claim 2, wherein when activated, the electrically powered means display a logo.

5. A reader as claimed in claim 2, wherein when activated, the electrically powered means display an image.

6. A reader as claimed in claim 1, wherein the electrically powered means are light emitting means (17; 17A, 17B, 17C, 17K) associated with said at least one coloured part (10) of the casing (1), the part (10) being at least partially light-transparent.

7. A reader as claimed in claim 6, wherein the light emitting means (17; 17A, 17B, 17C, 17K) are active at least when the reader is in the stand-by state.

8. A reader as claimed in claim 6, wherein the light emitting means comprise at least one coloured light source.

9. A reader as claimed in claim 8, wherein the light emitting means (17; 17A, 17B, 17C, 17K) are a coloured light source comprising at least one LED or photo-emitter (17; 17A, 17B, 17C, 17K).

10. A reader as claimed in claim 8, wherein the light emitting means are a coloured light source comprising at least one incandescent lamp.

11. A reader as claimed in claim 8, wherein the light emitting means are a coloured light source comprising at least one luminescent lamp.

12. A reader as claimed in claim 8, wherein the light emitting means are a coloured light source comprising at least one fluorescent lamp.

13. A reader as claimed in claim 8, wherein the light emitting means are a coloured light source comprising at least one laser diode.

14. A reader as claimed in claim 8, wherein the light source comprises a plurality of light emitting elements (17; 17A, 17B, 17C, 17K) generating light of different colour.

15. A reader as claimed in claim 14, wherein the various light emitting elements are at least two different LEDs (17, 17K) or photo-emitters generating light of different colour.

16. A reader as claimed in claim 14, wherein the light emitting elements are LEDs (17A, 17B, 17C) or photo-emitters forming part of an RGB light generator (17).

17. A reader as claimed in claim 14, by comprising selector means (22) enabling selective or combined activation of the plurality of coloured light emitting elements (17; 17A, 17B, 17C, 17K) of the light source.

18. A reader as claimed in claim 17, wherein the selector means are a plurality of switches (22) positioned in separate power lines (20B) of the individual light emitting elements (17A, 17B, 17C), the operation of each of these switches causing activation or deactivation of said elements.

19. A reader as claimed in claim 18, further comprising programmable means (20A) for operating the switches (22) positioned in power lines (20B) of the individual light emitting elements (17A, 17B, 17C).

20. A reader as claimed in claim 19, wherein the programmable means are a microprocessor circuit (20A).

21. A reader as claimed in claim 14, wherein the various light emitting elements (17; 17A, 17B, 17C, 17K) generating light of different colour are associated with a single support structure or printed circuit (18) independently of the coloured light generated and hence of the coloration assumed at least by a part (10) of the casing (1) of the optical code reader.

22. A reader as claimed in claim 1, wherein the electrically powered means activatable on command indicate different reader operating states by emitting light of different colour.

23. A reader as claimed in claim 22 wherein the light emitting means which indicate the different reader operating states by emitting light of different colour are the same as those which indicate the reader stand-by state.

24. A reader as claimed in claim 23 wherein the light emitting means are an RGB light source (17).

25. A reader as claimed in claim 22 wherein the light emitting means which indicate the different reader operating states by emitting light of different colour are different from those (17; 17A, 17B, 17C; 17K) which indicate the reader stand-by state.

26. A reader as claimed in claim 1, wherein the casing (1) is in one piece.

27. A reader as claimed in claim 1, wherein the casing (1) comprises two different structural portions (2, 3) connected together, at least one of these portions (2, 3) having at least one coloured part (10) at which those means (17; 17A, 17B, 17C; 17K) electrically activatable on command are present.

28. A reader as claimed in claim 1, wherein those electrically powered means activatable on command are located below the coloured part (10).

29. A reader as claimed in claim 1, wherein those electrically powered means activatable on command are visible through the coloured part (10).

* * * * *